United States Patent
Varn et al.

(10) Patent No.: US 11,462,062 B1
(45) Date of Patent: Oct. 4, 2022

(54) POWER CONNECTION FOR SMART LOCK DEVICES

(71) Applicant: Alarm.com Incorporated, Tysons, VA (US)

(72) Inventors: John Varn, Tequesta, FL (US); Dean Constantine, Ft. Lauderdale, FL (US); Donald Gerard Madden, Columbia, MD (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/930,410

(22) Filed: Jul. 16, 2020

Related U.S. Application Data

(60) Provisional application No. 62/876,026, filed on Jul. 19, 2019.

(51) Int. Cl.
*G07C 9/00* (2020.01)
*G05B 19/042* (2006.01)
*G08B 21/18* (2006.01)
*H01R 13/11* (2006.01)

(52) U.S. Cl.
CPC ....... *G07C 9/00174* (2013.01); *G05B 19/042* (2013.01); *G08B 21/182* (2013.01); *H01R 13/11* (2013.01); *G05B 2219/2639* (2013.01); *G07C 2009/00634* (2013.01)

(58) Field of Classification Search
CPC ...... G07C 9/00174; G07C 2009/00634; G07C 9/00912; G05B 19/042; G05B 2219/2639; G08B 21/182; H01R 13/11; E05B 47/00
See application file for complete search history.

(56) References Cited

U.S. PATENT DOCUMENTS

| | | | | |
|---|---|---|---|---|
| 5,819,563 A * | 10/1998 | Bianco | ................ | E05B 17/0062 70/278.3 |
| 5,943,888 A * | 8/1999 | Lawson | ................ | E05B 63/248 70/278.7 |
| 9,109,378 B2 | 8/2015 | Scalisi | | |
| 9,342,936 B2 | 5/2016 | Scalisi | | |
| 9,672,673 B1 * | 6/2017 | Gokcebay | ................ | G07C 9/27 |
| 9,683,392 B1 * | 6/2017 | Cheng | ...................... | G07C 9/22 |
| 9,892,579 B2 | 2/2018 | Ku | | |
| 10,125,519 B1 * | 11/2018 | Gengler | .................... | E05B 9/04 |
| 10,388,094 B2 * | 8/2019 | Johnson | .............. | E05B 47/0012 |

(Continued)

FOREIGN PATENT DOCUMENTS

| | | | | |
|---|---|---|---|---|
| CN | 102747891 | | 8/2015 | |
| EP | 1130197 A1 * | | 9/2001 | ......... E05B 15/0225 |
| WO | WO-02077399 A1 * | | 10/2002 | ............. E05B 47/00 |

*Primary Examiner* — Adnan Aziz
(74) *Attorney, Agent, or Firm* — Fish & Richardson P.C.

(57) ABSTRACT

A power connection for a smart lock device including a strike plate that is mounted to a door frame, the strike plate having one or more spring contacts in a recessed portion of the strike plate, a back portion of the strike plate that is connected to a power source, wherein the one or more spring contacts in the recessed portion of the strike plate are connected to the power source via an electrical wiring, and a smart lock device that is mounted to a door, the smart lock device including a deadbolt that is configured to extend from a side portion of the door, where the one or more spring contacts in the recessed portion of the strike plate are configured to align with one or more conductive segments of the deadbolt.

20 Claims, 4 Drawing Sheets

(56) References Cited

U.S. PATENT DOCUMENTS

| | | | |
|---|---|---|---|
| 10,697,203 B1* | 6/2020 | Gokcebay | E05B 63/0056 |
| 2017/0053467 A1* | 2/2017 | Meganck | G07C 9/00563 |
| 2018/0033227 A1* | 2/2018 | Gokcebay | G07C 9/00896 |
| 2018/0040182 A1* | 2/2018 | Malhotra | H04L 12/2829 |
| 2018/0080245 A1* | 3/2018 | Martin | E05B 17/2026 |
| 2018/0114389 A1* | 4/2018 | Geiszler | G07C 9/00309 |
| 2020/0347643 A1* | 11/2020 | Burke | E05B 45/06 |
| 2020/0349786 A1* | 11/2020 | Ho | G06K 9/00288 |

* cited by examiner

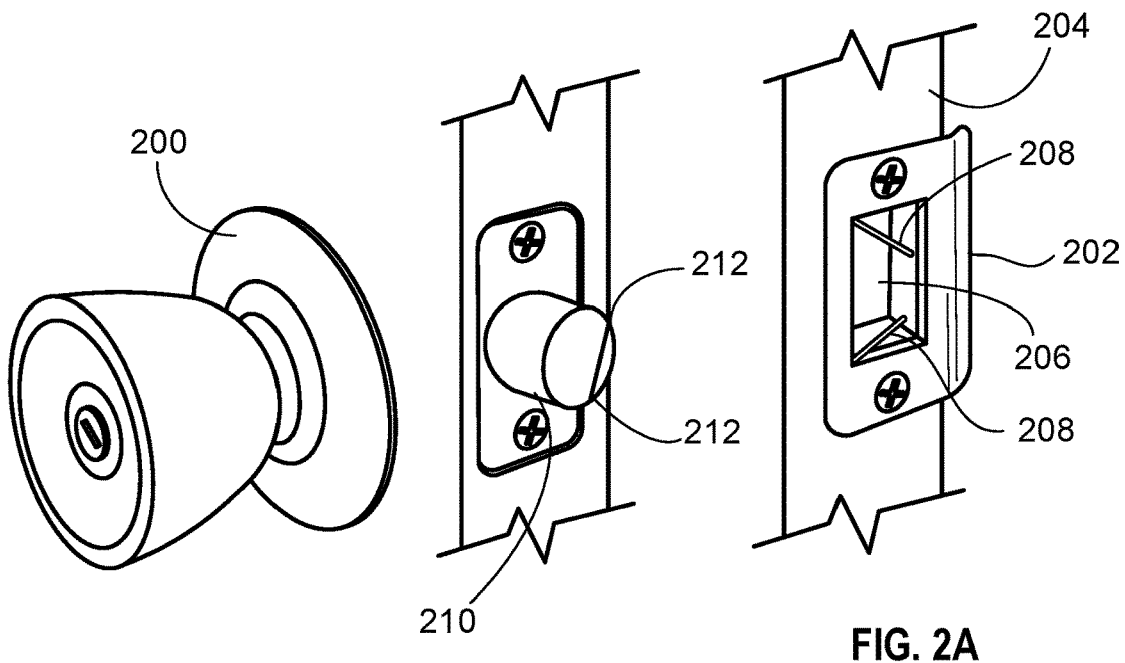
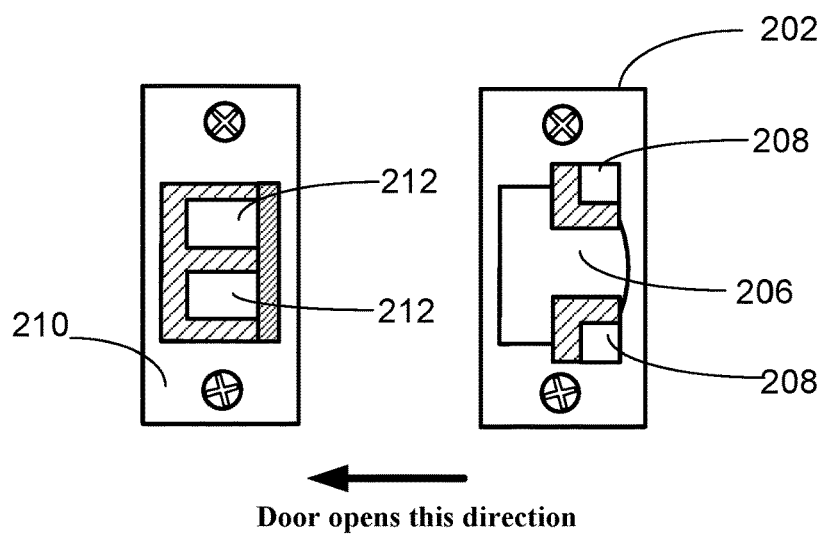
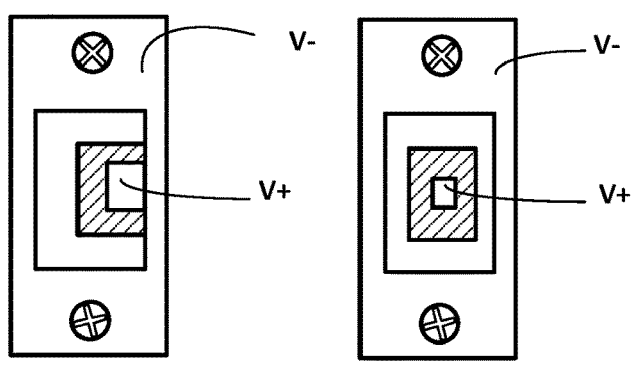
FIG. 2A
FIG. 2B

POWER CONNECTION FOR SMART LOCK DEVICES

CROSS REFERENCE TO RELATED APPLICATION

This applications claims benefit of U.S. Provisional Application No. 62/876,026 filed Jul. 19, 2019, and titled "Power Connection for Smart Lock Devices," which is incorporated by reference in its entirety.

TECHNICAL FIELD

This disclosure relates to property monitoring technology.

BACKGROUND

Many people equip homes and businesses with monitoring systems to provide increased security for their homes and businesses.

SUMMARY

Techniques are described for monitoring technology. For example, techniques are described for integrating one or more smart lock devices with power connections into a monitoring system. There are one or more smart features that can be incorporated into the doorknobs and locks at a monitored property. These smart features include key pads, cameras, display screens, user interfaces, actuated locking hardware, and other suitable smart features. Each of the smart features that may be utilized at a monitored property require a power source. The one or more smart lock devices with power connections can be used to generate power to power the smart lock devices and any other smart features that are utilized by the resident user of the monitored property.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIGS. 2A and 2B illustrate examples of the power connection for a smart lock device.

DETAILED DESCRIPTION

Techniques are described for integrating one or more smart lock devices with power connections into a home monitoring system. A property may be equipped with one or more doors that are each mounted with a smart lock device. Each of the one or more doors may be fitted with a custom strike plate that includes electrical contacts within the recessed/hole segment of the strike pad. When the bolt of the smart lock device is in a closed position, the conductive segments of the bolt aligns with the electrical contacts causing an electrical connection. The power generated may be used to charge the battery of the smart lock device, and in some implementations, may be used to power one or more other integrated door devices. The control unit of the home monitoring system may also monitor the voltage of the electrical connection, and based on the voltage data may determine whether the smart lock is functioning appropriately. For example, the control unit may determine there is a sudden decrease in voltage that is not accompanied by the bolt of the smart lock device being retracted indicating that a breach of the smart lock device is likely.

Figure 1:
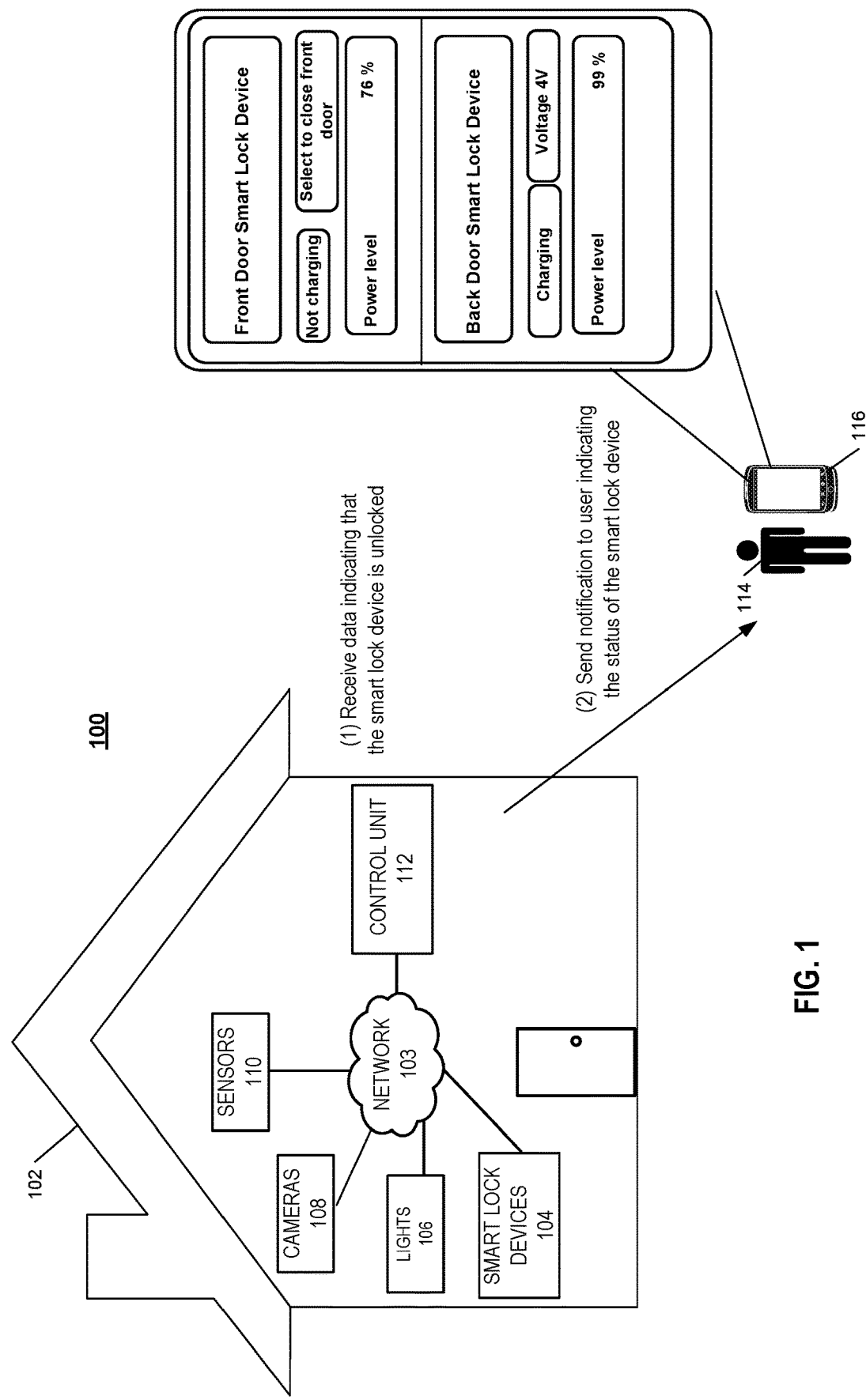
FIG. 1 illustrates an example of a home monitoring system.

FIG. 1 illustrates an example of a monitoring system 100 integrated with one or more smart lock devices 104. As shown in FIG. 1, a property 102 (e.g., a home) of a user 114 is monitored by an in-home monitoring system (e.g., in-home security system) that includes components that are fixed within the property 102. The in-home monitoring system may include a control unit 112, one or more lights 106, one or more cameras 108, one or more sensors 110, and one or more smart lock devices 104. The in-home monitoring system may also include other connected devices, for example, connected door hinges, a thermostat, garage doors, doorbells, smart televisions, entertainment devices, or any other suitable connected device.

As illustrated in FIG. 2A, the strike plate on the one or more doors with smart lock devices 104 may include a customized strike plate that allows the smart lock device to draw power from the contacts on the strike plate when the dead bolt of the smart lock device is engaged. The dead bolt of the smart lock device 104 may include one or more conductive segments which are each separated by one or more insulating layers. In some implementations, the dead bolt portion of an existing smart lock device may be used in conjunction with a custom strike plate. In other implementations, the dead bolt of an existing smart lock device may be replaced with a dead bolt with one or more conductive segments.

The customized strike plate may be similar in shape and size of a typical strike plate. The strike plate may include one or more spring contacts in the recessed portion of the strike plate. The one or more spring contacts in the recessed segment of the strike plate are configured to align with the one or more conductive segments of the dead bolt of the smart lock device. The spring contacts in the recessed segment of the strike plate are connected, via an electrical wiring, to a low voltage power source at the back portion of the strike plate. The customized strike plate may include one or more insulator segments. In some implementations the one or more insulator segments may line the edges of the recessed segment of the strike plate. The one or more insulators may be composed of a non-conductive, high strength material. For example, the one or more insulators may be composed of carbon fiber, or injection molded carbon fiber. In some implementations, the insulator segments may be located on the non-load bearing edges of the strike plate. The insulator portions of the strike plate are included to prevent shorting between the conductive portions of the bolt and the strike plate. In some implementations, the edge of the strike plate that faces the swing direction of the door, and the edge of the deadbolt that faces the swing direction of the door are both constructed from a high tensile strength material. For example, a metal material. In some implementations, the deadbolt and the strike pad are both connected to one pole of a voltage source, and the other pole of the voltage source connected is connected to the back face of the strike pad or the center of the deadbolt.

The electrical wiring that is connected to the spring contacts in the recessed segment of the strike plate may be mounted under the door trim, or may be mounted over the door trim and concealed by a cover. In some examples, the wiring may be concealed by a cover. In other implementations, the electrical wiring may be routed through the hole segment of the strike plate. The electrical wiring may be configured to run either under the door trim or next to the door trim and baseboard to a transformer. The transformer may be mounted on a wall of the property 102 that is out of plain sight of the residents of the property 102. In some implementations, the electrical wiring may be routed behind the jamb of the door to the side of the door that is opposite to the swing of the door.

As illustrated in FIG. 1, the one or more smart lock devices 104 located throughout the monitored property 102 may be in communication with the control unit 112. The resident user 114 at the monitored property 102 may replace the strike plate of a subset of the one or more smart lock devices 104 with the customized strike plate to allow the smart lock devices 104 to have a power connection. In these implementations, the dead bolt of an existing smart lock device 104, that is conductive, can engage with the spring contacts of the customized strike plate to generate power. In other implementations, each of the one or more smart lock devices 104 can be replaced with one or more smart lock devices 104 that are equipped with customized strike pads that include one or more spring contacts. A smart lock device 104 with a power connection may be mounted to an indoor door, or an outdoor door located at the property 102. A smart lock device 104 with a power connection may be mounted to a sliding door, a folding door, a pocket door, or any other suitable type door.

The control unit 112 receives data from the one or more smart lock devices 104. For the example, the control unit 112 may receive data indicating whether the smart lock device 104 is locked or unlocked. As illustrated, when the control unit 112 receives data from a smart lock device 104 indicating that the smart lock device is locked, the control unit 112 may send a notification to the user device 116 of a resident of the property 102. The notification that is communicated to the user device 116 of the resident of the property 102 when the smart lock device 104 is locked may indicate to the user 114 which smart lock is closed. In some implementations, the notification may indicate whether the smart lock device 104 is being charged or not. In some implementations, the notification may indicate the measured voltage for the power connection. In some implementations, when the control unit 112 receives data indicating that the smart lock device 104 is locked, and data indicating that the power connection is charging, the control unit 112 may generate an alert notification. For example, the control unit 112 may command the smart lock device 104 to generate an audible alert.

In some examples, the resident user 114 may access status information about the power connection for the smart lock device 104 through a smart home monitoring application running on the user device 116. The smart home monitoring application may be managed by the control unit 112, and may display status information to the resident user 114. For example, the monitoring application may indicate the amount of power that has been drawn from the contacts, and may indicate a time period of use that can occur based on the amount of power. In some implementations, where the power connection for the smart lock device 104 is also being used to generate power for another connected device, the status information may indicate the amount of power used by the connected device. For example, the status information on the smart home monitoring application may indicate that smart door knob used 50% of the generated power.

In some implementations, the smart lock device 104 may automatically lock when the power is less than a threshold power value. In these implementations, the door that is mounted with the smart lock device 104 may also be equipped with a connected door hinge. The connected door hinge may be configured to retrofit to any indoor or outdoor door. The connected door hinge may look similar to a typical door hinge. The door hinge may include a frame side plate and a door side plate that are each the same size and shape of the plates of a standard door hinge plate. In some implementations, the door hinge may include a motor and a telescopic rod that is attached to the door side plate of the hinge, and that extends across to the frame side plate of the door hinge. The telescopic rod may expand and contract to open and close the door hinge. In other examples, the door hinge may include a motor and a slotted pin. The motor may move and cause the slotted pin to open and close the door hinge. The connected door hinge may include a wireless communicator and a small battery that powers the door hinge. The battery and the wireless communicator may be located inside a drawer on the frame side plate of the hinge. The connected door hinge may include a status LED at the top of the pin of the hinge. When the door with the smart lock device 104 is in an open unlocked position, the control unit 112 may command the connected door hinge on the door with the device 104 to close and lock when the power is less than a threshold power value. In some examples, the smart device 104 may lock after a period of time to allow the user to override the automatic lock command.

In these implementations, the monitoring control unit may determine whether a person is in the room with the door configured with the connected hinge and smart lock device 104 before automatically closing the door and locking the smart lock device. In some examples, the monitoring control unit may prompt a camera in the room of the door with the connected hinge and smart lock device to initiate the capture of image data, or determine whether motion sensor data has been received from one or more motion sensors in the room. In some examples, the monitoring control unit may receive location data from each the one or more user devices of the one or more residents of the property 102. The monitoring control unit may determine not to automatically lock the door based on receiving location data that indicates that a particular user is within a threshold distance from the monitored property. In these examples, when the monitoring control unit determines that each of the residents users are outside of the threshold distance from the property, the monitoring control unit may then command the connected door hinge to close and the smart lock device to lock the door. In other examples, the monitoring control unit may determine not to automatically close and lock a door when the system is in an alarm state. For example, when the alarm at the property is sounding, the monitoring control unit may not command the smart lock device and connected door hinge to close and lock the door.

The monitoring control unit may automatically return each of the one or more doors located throughout the property to its previous open/close status based on determining that at least one of the residents has moved within the threshold device from the monitored property. For example, the monitoring control unit may command the connected door hinge device, and the smart lock device to automatically close and lock because the power level of the smart lock device is below the power threshold, and may command the connected door hinge device and smart lock device to unlock and open based on determining that a resident is within the threshold distance from the home.

In these implementations, where the door that is mounted with the smart lock device 104 is equipped with a connected door hinge, the resident user 114 may access the smart home monitoring application on the user device 116 to automatically close and lock the door. For example, as illustrated in FIG. 1, the resident user 114 may receive a notification, that indicates that the front door lock device is not charging, and the notification may include a selection that when selected by the user 114, causes the connected door hinge on the front door to close so that the smart lock device can charge. The resident user 114 may also access the smart home monitoring application to automatically open a door when the smart lock device is charged 100%. In these examples, the control unit 112 may send a notification to the user device 116 indicating that the smart lock device is fully charged. The notification may include an option to discontinue the charging of the smart lock device, when selected the control unit 112 may command the connected door hinge on the door with the smart lock device to unlock and/or open.

In these implementations, where the door that is mounted with the smart lock device 104 is also equipped with a connected door hinge, the resident user 114 may use the smart home monitoring application on the user device 116 to set a timing schedule for the opening and closing of the door with smart lock device 104. The user 114 may set the timing schedule based on the amount of power required to power the smart lock devices 104 and the other one or more connected devices. For example, the user 114 may select that the door with the smart lock device 104 stay closed during the week from Monday to Friday 9:00 AM to 4:00 PM. In some implementations, where the door with the smart lock device 104 is closed, the dead bolt may engage to allow the power connection to form. In some implementations, the power connection for the smart lock device 104 may be connected in state where the door is closed and the dead bolt is not latched. In these implementations, the smart lock device 104 may include an additional latch that include conductive segments and that connects with the spring contacts in the recessed portion of the strike plate. The latch can allow the electrical connection to form with the spring contacts, and cause power to be generated even when the dead bolt is not locked. In these implementations, the door with the smart lock device 104 can charge when the door is not locked.

In some implementations, the property 102 may not be monitored by an in-home monitoring system. In such examples, the user may monitor the status of the smart lock devices 104 through the use of a smart home monitoring application. Each of the one or more smart lock devices 104 located throughout the property 102 may be identified in the application, and the user may have the ability to check the status of the power generated by the power connection. The smart home monitoring application may be used to determine when the smart lock is in a locked position and whether or not the device is generating power or not.

FIGS. 2A and 2B illustrate examples of the power connection for a smart lock device. As illustrated in FIG. 2A, the smart lock device 200 may include a customized strike plate 202 that is mounted on the door frame 204. The customized strike plate 202 may be similar in shape and size of a typical strike plate. The strike plate 202 may include one or more spring contacts 208 in the recessed portion 206 of the strike plate 202. The one or more spring contacts 208 in the recessed portion 206 of the strike plate 202 are configured to align with the one or more conductive segments 212 of the dead bolt 210 of the smart lock device 200. The spring contacts 208 in the recessed segment 206 of the strike plate 202 are connected, via an electrical wiring, to a low voltage power source at the back portion of the strike plate 202. The customized strike plate 202 allows the smart lock device 104 to draw power from the spring contacts 208 on the strike plate 202 when the dead bolt of the smart lock device 200 is engaged.

The customized strike plate 202 may include one or more insulator segments. In some implementations the one or more insulator segments may line the edges of the recessed segment of the strike plate 202. The one or more insulators may be composed of a non-conductive, high strength material. For example, the one or more insulators may be composed of carbon fiber, or injection molded carbon fiber. In some implementations, the insulator segments may be located on the non-load bearing edges of the strike plate. The insulator portions of the strike plate are included to prevent shorting between the conductive portions of the bolt and the strike plate. In some implementations, the edge of the strike plate that faces the swing direction of the door, and the edge of the deadbolt that faces the swing direction of the door are both constructed from a high tensile strength material. For example, a metal material. In some implementations, the deadbolt and the strike plate are both connected to one pole of a voltage source, and the other pole of the voltage source connected is connected to the back face of the strike pad or the center of the deadbolt.

The electrical wiring that is connected to the spring contacts in the recessed segment of the strike plate may be mounted under the door trim, or may be mounted over the door trim and concealed by a cover. In some examples, the wiring may be concealed by a cover. In other implementations, the electrical wiring may be routed through the hole segment of the strike plate. The electrical wiring may be configured to run either under the door trim or next to the door trim and baseboard to a transformer. The transformer may be mounted on a wall of the property 102 that is out of plain sight of the residents of the property 102. In some implementations, the electrical wiring may be routed behind the jamb of the door to the side of the door that is opposite to the swing of the door.

As illustrated in FIG. 2B, the edge of the strike plate 202 that faces the swing direction of the door, and the edge of the dead bolt 210 that faces the swing direction of the door are both constructed from a high tensile strength material. For example, a metal material. In some examples, the dead bolt 210 and the strike plate 202 are both connected to one pole of a voltage source, and the other pole of the voltage source connected is connected to the back face of the strike pad 202 or the center of the dead bolt.

Figure 3:
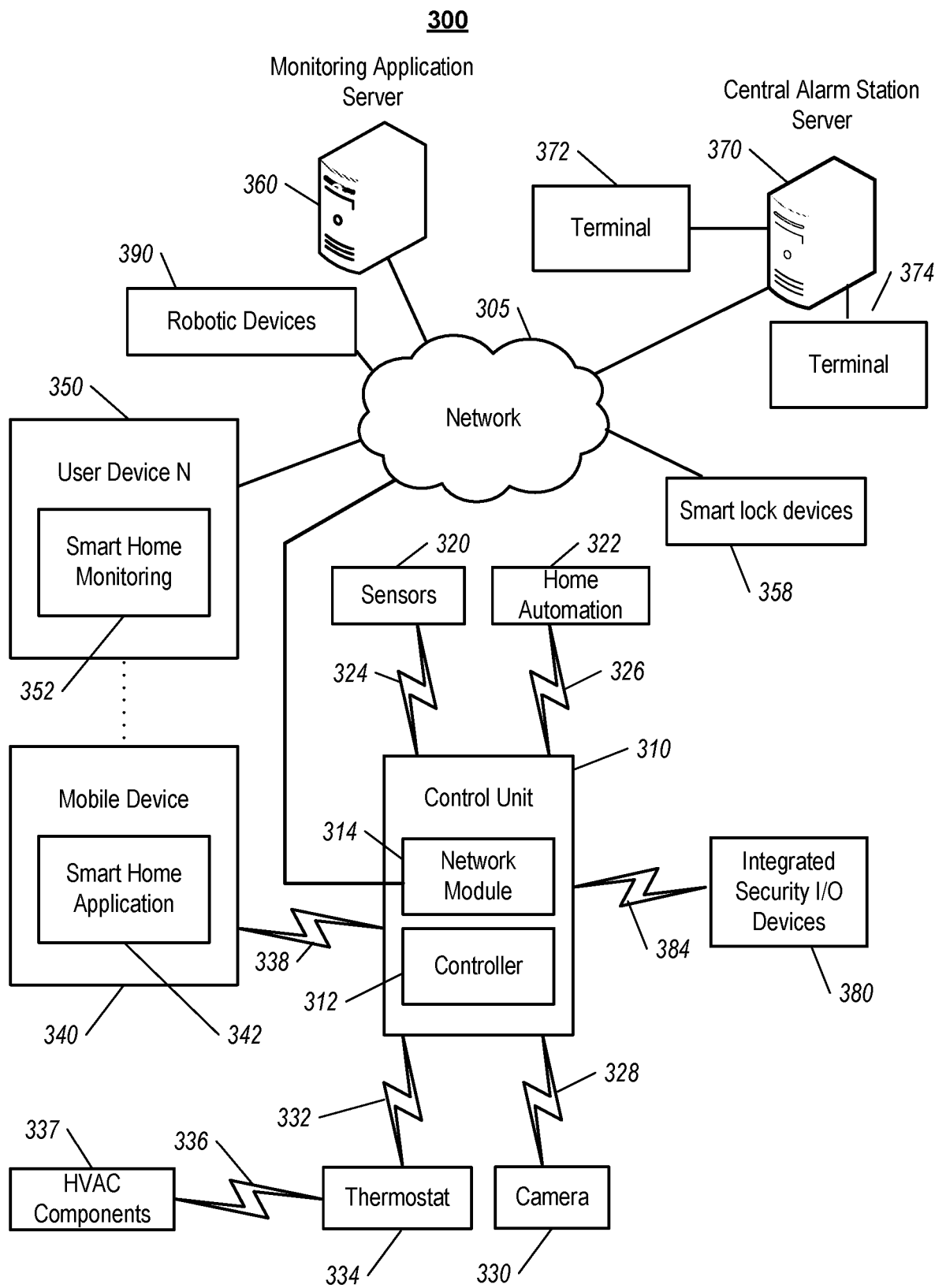
FIG. 3 illustrates an example of a monitoring system integrated with smart lock devices.

FIG. 3 is a diagram illustrating an example of a home monitoring system 300. The electronic system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data. The sensors 320 can also include a radio-frequency identification (RFID) sensor that identifies a particular article that includes a pre-assigned RFID tag.

The control unit 310 communicates with the home automation controls 322 and a camera 430 to perform monitoring. The home automation controls 322 are connected to one or more devices that enable automation of actions in the home. For instance, the home automation controls 322 may be connected to one or more lighting systems and may be configured to control operation of the one or more lighting systems. Also, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320. In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312. In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

The system 300 includes one or more smart lock devices 358. The one or more smart lock devices 358 are mounted to one or more doors, each of the one or more doors are fitted with a custom strike plate that includes electrical contacts within the hole segment of the strike plate. The electrical contacts are connected to a low voltage power via a wire that is attached to the back of the strike plate. The one or more smart lock devices are configured to communicate with the control unit at the monitored property. In some implementations, the wire may be configured to transmit data in addition to power. In these implementations, the data to the smart locks may be communicated through the wired connections, and may be used when there is no wireless connection.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 390 may be robotic devices 390 that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing). In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station. In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390. Also, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 323, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 323, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events (e.g., alarm events) generated by the control unit 310. In this example, the monitoring server 360 may exchange electronic communications with the network module 314 included in the control unit 310 to receive information regarding events (e.g., alerts) detected by the control unit 310. The monitoring server 360 also may receive information regarding events (e.g., alerts) from the one or more user devices 340 and 350. In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350. The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The central alarm station server 370 is an electronic device configured to provide alarm monitoring service by exchanging communications with the control unit 310, the one or more mobile devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information. In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring server 360 and/or the control unit 310 over the network 305. The user device 350 may be configured to display a smart home user interface 352 that is generated by the user device 350 or generated by the monitoring server 360. For example, the user device 350 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, the robotic devices 390, and the light switch panel 357. The one or more user devices 340 and 350 receive data directly from the sensors 320, the home automation controls 322, the camera 330, the robotic devices 390, and the light switch panel 357 and sends data directly to the sensors 320, the home automation controls 322, the camera 330, the robotic devices 390, and the light switch panel 357. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, the robotic devices 390, and the light switch panel 357 are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, the robotic devices 390, and the light switch panel 357 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, the robotic devices 390, and the light switch panel 357 to a pathway over network 305 when the one or more user devices 340 and 350 are farther from the sensors 320, the home automation controls 322, the camera 330, the thermostat 334, the robotic devices 390, and the stair lift module. In some examples, the system leverages GPS information from the one or more user devices 340 and 350 to determine whether the one or more user devices 340 and 350 are close enough to the sensors 320, the home automation controls 322, the camera 330, the thermostat 334, the robotic devices 390, and the light switch panel 357 to use the direct local pathway or whether the one or more user devices 340 and 350 are far enough from the sensors 320, the home automation controls 322, the camera 330, the thermostat 334, the robotic devices 390, and the light switch panel 357 that the pathway over network 305 is required. In other examples, the system leverages status communications (e.g., pinging) between the one or more user devices 340 and 350 and the sensors 320, the home automation controls 322, the camera 330, the thermostat 334, the robotic devices 390, and the light switch panel 357 to determine whether communication using the direct local pathway is possible. If communication using the direct local pathway is possible, the one or more user devices 340 and 350 communicate with the sensors 320, the home automation controls 322, the camera 330, the thermostat 334, the robotic devices 390, and the light switch panel 357 using the direct local pathway. If communication using the direct local pathway is not possible, the one or more user devices 340 and 350 communicate with the sensors 320, the home automation controls 322, the camera 330, the thermostat 334, the robotic devices 390, and the light switch panel 357 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

Figure 4:
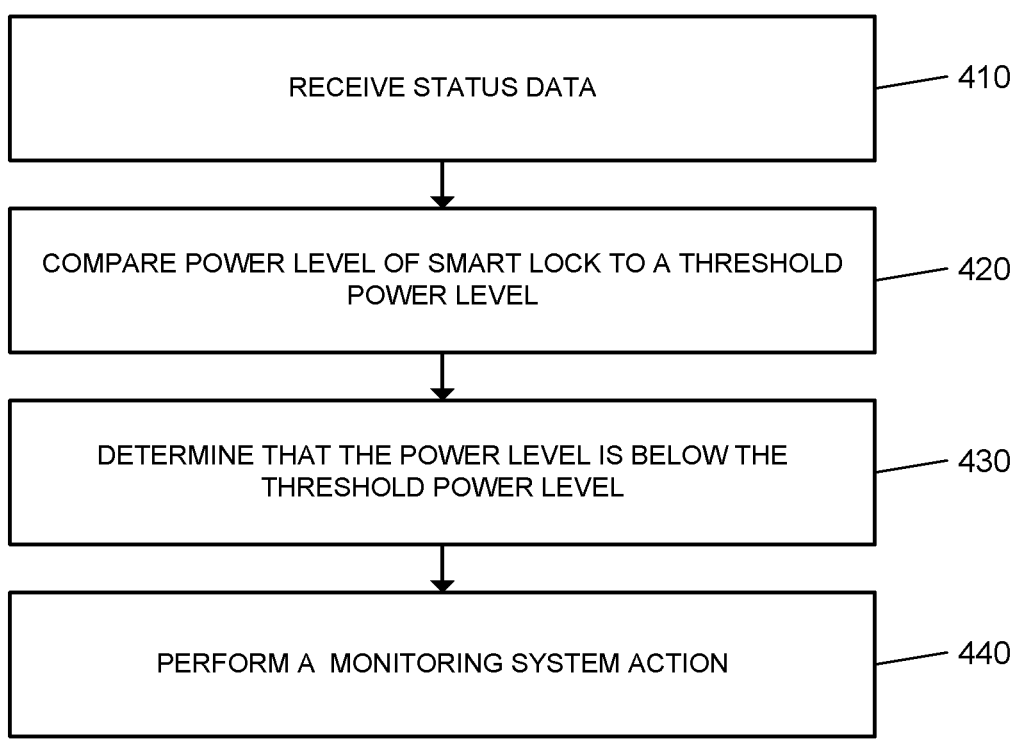
FIG. 4 is a flow chart of an example process for performing a monitoring system action.

FIG. 4 illustrates an example process 400 for performing a monitoring system action. The process 400 may be performed by a monitoring control unit of a home monitoring system. The home monitoring system may include one or more smart lock devices 104 that are mounted on one or more doors located throughout the property 102. Each of the one or more doors that are equipped with a smart lock device 104 may include a custom fitted strike plate that has one or more electrical contracts/spring contacts in a recessed portion of the strike plate. A back portion of the strike plate is connected to a power source, and the one or more spring contacts that are located in the recessed portion of the strike plate are connected to the power source at the back portion of the strike plate via an electrical wiring.

The customized strike plate is the size and shape of a standard strike plate, and may be composed of a high tensile strength material. The one or more spring contacts in the recessed portion of the strike plate are configured to project into the recessed portion of the strike plate. When the door is in a closed position, the deadbolt of the smart lock device 104 is configured to fit into the recessed portion of the strike plate. The conductive segments of the deadbolt are configured to align with the one or more spring contacts in the recessed portion of the strike plate. The strike plate and the deadbolt of the smart lock device 104 are connected to one pole of the power source, and the other pole of the power source is connected to the back portion of the strike plate. The smart lock device 104 is configured to draw power from the power source via the one or more spring contacts in the recessed portion of the strike plate. The deadbolt from the smart lock device 104 compresses the one or more spring contacts when engaged in the closed position, and completes the electrical circuit between the smart lock device and the power source, causing the flow of electricity to the smart lock device. The smart lock device 104 continues to be charged while in the door is in the closed position.

In some implementations, the smart lock device 104 may include an additional latch that includes one or more conductive segments that align with the spring contacts in the recessed portion of the strike plate. In these implementations, the additional latch connects with the spring contacts, and cause power to be generated to charge the smart lock device 104, when the door is in a closed position but the deadbolt is not locked.

The process 400 includes the monitoring control unit 112 receiving status data from a smart lock device (410). The status data includes data that indicates a power level of the smart lock device 104 and whether the door that is equipped with the smart lock device 104 is opened or closed. In some examples, the status data may indicate whether the smart lock device 104 is being charged or not. The monitoring control unit 112 may continuously receive status data from the one or more smart lock devices 104 located throughout the property 102. In some examples, the monitoring control unit 112 may receive status data from the one or more smart lock devices intermittently.

The monitoring control unit compares the power level of the smart lock device to a threshold power level (420). In some examples, the threshold power level may be a power level that is set by the monitoring control unit 112, in other examples, the threshold power level may be a user set value. The monitoring control unit determines that the power level of the smart lock device is below the threshold power level (430).

The monitoring control unit performs a monitoring system action (440). The monitoring control unit 112 may communicate a notification to the user device of a resident of the monitored property 102 indicating that the power level of the smart lock device 104 is below a threshold. In some implementations, the monitoring control unit 112 may be in communication with one or more connected door hinges that are mounted to the one or more doors that are equipped with smart lock devices 104. A connected door hinge is configured to automatically open and or close the door that it is mounted to. In these implementations, the monitoring control unit 112 may perform a monitoring system action by commanding the connected door hinge to automatically close the door to charge the smart lock device 104. The connected door hinge is configured to retrofit any standard indoor or outdoor door, and looks similar to a typically door hinge. The connected door hinge includes a first plate that is connected to the door frame, a second plate that is connected to the door, a motor, and a telescopic rod that is connected to the second plate, and that is configured to extend across to the first plate. The telescopic rod is configured to extend across to the first plate to cause the door to open. The telescopic rod is configured to contract to cause the door to close.

The monitoring control unit 112 may perform a monitoring system action by commanding the connected door hinge to close the door, and lock the smart lock device by engaging the deadbolt into a locked position. The monitoring control unit 112 may command the smart lock device to unlock by disengaging the lock portion of the deadbolt when the smart lock device is fully charged.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A power connection for a smart lock device, the power connection comprising:
  a strike plate that is mounted to a door frame, the strike plate having one or more spring contacts in a recessed portion of the strike plate;
  a back portion of the strike plate that is connected to a power source, wherein the one or more spring contacts in the recessed portion of the strike plate are connected to the power source via an electrical wiring; and
  a smart lock device that is mounted to a door, the smart lock device including a deadbolt that is configured to extend from a side portion of the door, wherein the one or more spring contacts in the recessed portion of the strike plate are configured to align with one or more conductive segments of the deadbolt when the door is in a closed position,
  wherein the smart lock device transmits, to a control unit and when the deadbolt is in an unlocked position, data that indicates that both the power connection is not charging the smart lock device and a remaining power of the smart lock device, and
  wherein the data transmitted by the smart lock device, that indicates that both the power connection is not charging the smart lock device and a remaining power of the smart lock device, triggers the control unit to cause the deadbolt to i) extend into a locked position in the recessed portion of the strike plate and ii) enable the power connection to start charging the smart lock device.

2. The power connection of claim 1, wherein the strike plate is the size and shape of a standard strike plate.

3. The power connection of claim 1, wherein each of the one or more spring contacts are located at an upper section and at a lower section of the recessed portion of the strike plate, and each are configured to project into the recessed portion.

4. The power connection of claim 1, wherein when the door is in the closed position, the deadbolt compresses each of the one or more spring contacts, to fit into the recessed portion of the strike plate; and
  the smart lock device is configured to draw power from the spring contacts when the deadbolt is engaged with the one or more spring contacts.

5. The power connection of claim 1, wherein the deadbolt and the strike plate are both connected to one pole of the power source, and the other pole of the power source is connected to the back portion of the strike plate.

6. The power connection of claim 1, wherein the strike plate includes an insulator portion that is configured to line the edges of the recessed portion of the strike plate, wherein the insulator portion is composed of a material that has a high strength and that is non-conductive.

7. The power connection of claim 6, wherein the insulator portion is composed of carbon fiber.

8. The power connection of claim 1, wherein the strike plate includes an insulator portion that is located on a non-load bearing edge of the strike plate.

9. The power connection of claim 1, wherein the strike plate is composed of a high tensile strength material.

10. The power connection of claim 1, wherein the deadbolt is composed of a high tensile strength material.

11. A method comprising:
  receiving, by a control unit and when a deadbolt is in an unlocked position and from a smart lock device that a) is mounted to a door and b) includes the deadbolt configured to extend from a side portion of the door, data that indicates that both (a) a power source is not charging the smart lock device and (b) a remaining power of the smart lock device; and
  in response to receiving the data that indicates that both (a) the power source is not charging the smart lock device and (b) the remaining power of the smart lock device, sending, by the control unit, an instruction to cause the deadbolt to i) extend into a locked position in a recessed portion of a strike plate that is mounted to a door frame, the strike plate having one or more spring contacts in the recessed portion of the strike plate that align with one or more conductive segments of the deadbolt when the door is in a closed position and ii) enable a power source connected to a back portion of the strike plate to start charging the smart lock device using the one or more spring contacts in the recessed portion of the strike plate that are connected to the power source via electrical wiring.

12. The method of claim 11, wherein the strike plate is the size and shape of a standard strike plate.

13. The method of claim 11, wherein each of the one or more spring contacts are located at an upper section and at a lower section of the recessed portion of the strike plate, and each are configured to project into the recessed portion.

14. The method of claim 11, wherein sending the instructions comprises sending, by the control unit, the instruction to cause:

the deadbolt to compress each of the one or more spring contacts when the door is in the closed position and fit into the recessed portion of the string plate; and the smart lock device to draw power from the spring contacts when the deadbolt is engaged with the one or more spring contacts.

15. The method of claim 11, wherein the deadbolt and the strike plate are both connected to one pole of the power source, and the other pole of the power source is connected to the back portion of the strike plate.

16. The method of claim 11, wherein the strike plate includes an insulator portion that is configured to line the edges of the recessed portion of the strike plate, wherein the insulator portion is composed of a material that has a high strength and that is non-conductive.

17. The method of claim 16, wherein the insulator portion is composed of carbon fiber.

18. The method of claim 11, wherein the strike plate includes an insulator portion that is located on a non-load bearing edge of the strike plate.

19. The method of claim 11, wherein the strike plate is composed of a high tensile strength material.

20. The method of claim 11, wherein the deadbolt is composed of a high tensile strength material.

* * * * *